(12) United States Patent
Zhang et al.

(10) Patent No.: US 11,961,243 B2
(45) Date of Patent: Apr. 16, 2024

(54) OBJECT DETECTION USING IMAGE ALIGNMENT FOR AUTONOMOUS MACHINE APPLICATIONS

(71) Applicant: NVIDIA Corporation, Santa Clara, CA (US)

(72) Inventors: Dong Zhang, Clarksville, TN (US); Sangmin Oh, San Jose, CA (US); Junghyun Kwon, Santa Clara, CA (US); Baris Evrim Demiroz, San Jose, CA (US); Tae Eun Choe, Belmont, CA (US); Minwoo Park, Saratoga, CA (US); Chethan Ningaraju, Munich (DE); Hao Tsui, Munich (DE); Eric Viscito, Shelburne, VT (US); Jagadeesh Sankaran, Dublin, CA (US); Yongqing Liang, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 307 days.

(21) Appl. No.: 17/187,228

(22) Filed: Feb. 26, 2021

(65) Prior Publication Data
US 2021/0264175 A1 Aug. 26, 2021

Related U.S. Application Data

(60) Provisional application No. 62/982,035, filed on Feb. 26, 2020.

(51) Int. Cl.
G06T 7/00 (2017.01)
B60W 60/00 (2020.01)
(Continued)

(52) U.S. Cl.
CPC ............ *G06T 7/246* (2017.01); *B60W 60/001* (2020.02); *G06F 18/2148* (2023.01); *G06N 3/08* (2013.01);
(Continued)

(58) Field of Classification Search
CPC .......... G06N 3/08; G06N 3/045; G06N 20/00; G06T 7/246; G06T 2207/10016;
(Continued)

(56) References Cited

U.S. PATENT DOCUMENTS 10,289,469 B2 5/2019 Fortino et al.
10,885,698 B2 1/2021 Muthler et al.
(Continued)

FOREIGN PATENT DOCUMENTS

| CN | 110569704 A | * 12/2019 | ......... G06K 9/00798 |
|---|---|---|---|
| WO | WO-2018058356 A1 | * 4/2018 | ......... G06K 9/00791 |
| WO | 2018/224355 A1 | 12/2018 | |

OTHER PUBLICATIONS

Agrwal et al, Real-time detection of independent motion using stereo, 2005 Seventh IEEE Workshops on Applications of Computer Vision (WACV/MOTION'05)—vol. 1 (Year: 2005).*

(Continued)

*Primary Examiner* — Ping Y Hsieh
*Assistant Examiner* — Xiao Liu
(74) *Attorney, Agent, or Firm* — Taylor English Duma L.L.P.

(57) ABSTRACT

A geometric approach may be used to detect objects on a road surface. A set of points within a region of interest between a first frame and a second frame are captured and tracked to determine a difference in location between the set of points in two frames. The first frame may be aligned with the second frame and the first pixel values of the first frame may be compared with the second pixel values of the second
(Continued)

frame to generate a disparity image including third pixels. One or more subsets of the third pixels that have a value above a first threshold may be combined, and the third pixels may be scored and associated with disparity values for each pixel of the one or more subsets of the third pixels. A bounding shape may be generated based on the scoring.

31 Claims, 15 Drawing Sheets

(51) Int. Cl.
| | |
|---|---|
| *G06F 18/214* | (2023.01) |
| *G06N 3/08* | (2023.01) |
| *G06T 7/246* | (2017.01) |
| *G06V 10/25* | (2022.01) |
| *G06V 10/75* | (2022.01) |
| *G06V 20/58* | (2022.01) |
| *G06V 20/56* | (2022.01) |

(52) U.S. Cl.
CPC ............ *G06V 10/25* (2022.01); *G06V 10/751* (2022.01); *G06V 20/58* (2022.01); *G06V 20/56* (2022.01)

(58) Field of Classification Search
CPC . G06T 7/73; G06T 2207/20084; G06T 7/136; G06T 2207/30256; G06T 7/269; G08G 1/166; G06V 10/25; G06V 20/58; G06V 10/751; G06V 20/56; G06V 10/82; G06V 20/588; G06V 2201/07; G06V 40/167; B60W 60/001; B60W 30/0956
See application file for complete search history.

(56) References Cited

U.S. PATENT DOCUMENTS

| | | | |
|---|---|---|---|
| 2005/0131646 A1* | 6/2005 | Camus | G06V 20/58 382/104 |
| 2006/0245653 A1* | 11/2006 | Camus | G06V 20/58 382/199 |
| 2015/0363635 A1* | 12/2015 | Suri | G06V 40/16 386/241 |
| 2016/0321074 A1 | 11/2016 | Hung et al. | |
| 2017/0256065 A1* | 9/2017 | Wu | G06T 7/215 |
| 2018/0121273 A1 | 5/2018 | Fortino et al. | |
| 2021/0042514 A1* | 2/2021 | Shimada | G06V 40/107 |

OTHER PUBLICATIONS

Suhr et al Dense stereo based critical area detection for an active pedestrian protection system, Electronics Letters, vol. 48, Issue 19, Sep. 2012, pp. 1199-1201 (Year: 2012).*
Bhattacharya et al, Moving object detection and tracking in forward looking infra-red aerial imagery, 2011 Springer (Year: 2011).*
Shu et al, Dense Stereo Matching Based on PCNN, 2009 First International Conference on Information Science and Engineering (pp. 1203-1206) (Year: 2009).*
Kim et al Wavelet-transform-based stereo residual image compression , Optical Engineering, vol. 41, Issue 4, (Apr. 2002).*
Wang, Image and Video Processing, NYU lecture Note (Year: 2019).*
Wikipedia, Cross-correlation (Year: 2023).*
Wikipedia, Binocular disparity (Year: 2023).*
International Preliminary Report on Patentability received for PCT Application No. PCT/US2021/020081. dated Sep. 9, 2022, 10 pages.
"Taxonomy and Definitions for Terms Related to Driving Automation Systems for On-Road Motor Vehicles", National Highway Traffic Safety Administration (NHTSA), a Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), a Division of the US Department of Transportation, and the Society of Automotive Engineers (SAE), Standard No. J3016-201806, pp. 1-35 (Jun. 15, 2018).
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
"Methodology of Using a Single Controller (ECU) for a Fault-Tolerant/Fail-Operational Self-Driving System", U.S. Appl. No. 62/524,283, filed Jun. 23, 2017.
"Systems and Methods for Safe and Reliable Autonomous Vehicles" U.S. Appl. No. 62/584,549, filed Nov. 10, 2017.
"System and Method for Controlling Autonomous Vehicles", U.S. Appl. No. 62/614,466, filed Jan. 7, 2018.
"System and Method for Safe Operation of Autonomous Vehicles", U.S. Appl. No. 62/625,351, filed Feb. 2, 2018.
"Conservative Control for Zone Driving of Autonomous Vehicles Using Safe Time of Arrival", U.S. Appl. No. 62/628,831, filed Feb. 9, 2018.
"System and Method for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for autonomous vehicles" U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Convolutional Neural Networks to Detect Drivable Freespace for Autonomous Vehicles" U.S. Appl. No. 62/643,665, filed Mar. 15, 2018.
"Deep Neural Network for Estimating Depth from Stereo Using Semi-Supervised Learning", U.S. Appl. No. 62/646,148, filed Mar. 21, 2018.
"System and Methods for Advanced AI-Assisted Vehicles", U.S. Appl. No. 62/648,358, filed Mar. 26, 2018.
"System and Method for Training, Testing, Verifying, and Validating Autonomous and Semi-Autonomous Vehicles", U.S. Appl. No. 62/648,399, filed Mar. 27, 2018.
"Method and System of Remote Operation of a Vehicle Using an Immersive Virtual Reality Environment", U.S. Appl. No. 62/648,493, filed Mar. 27, 2018.
"System and Methods for Virtualized Intrusion Detection and Prevent System in Autonomous Vehicles", U.S. Appl. No. 62/682,803, filed Jun. 8, 2018.
"Deep Learning for Path Detection in Autonomous Vehicles", U.S. Appl. No. 62/684,328, filed Jun. 13, 2018.
"Methods for High-Precision, High-Accuracy Lane Detection in Autonomous Driving Applications", U.S. Appl. No. 62/699,669, filed Jul. 17, 2018.
"Programmable Vision Accelerator", U.S. Appl. No. 15/141,703, filed Apr. 28, 2016.
"Reliability Enhancement Systems and Methods" U.S. Appl. No. 15/338,247, filed Oct. 28, 2016.
Pinggera, P., Ramos, S., Gehrig, S., Franke, U., Rother, C., & Mester, R. (Oct. 2016). Lost and found: detecting small road hazards for self-driving vehicles. In 2016 IEEE/RSJ International Conference on Intelligent Robots and Systems (IROS) (pp. 1099-1106). IEEE.
Cao, Y., et al., "Vehicle motion analysis based on a monocular vision system", IEE Conference Publication, p. 1 (2008) (Abstract Only).

(56) References Cited

OTHER PUBLICATIONS

Lipton, A. J., et al., "Moving Target Classification and Tracking from Real-time Video", Applications of Computer Vision, IEEE, pp. 1-7 (1998).
Li, Y., and Ruichek, Y., "Occupancy Grid Mapping in Urban Environments from a Moving On-Board Stereo-Vision System", MDPI Journal Sensors, vol. 14, pp. 10454-10478 (2014).
International Search Report and Written Opinion received for PCT Patent Application No. PCT/US2021/020081, dated Jun. 10, 2021, 12 pages.

* cited by examiner

OBJECT DETECTION USING IMAGE ALIGNMENT FOR AUTONOMOUS MACHINE APPLICATIONS

CROSS-REFERENCE TO RELATED APPLICATIONS

This application claims the benefit of U.S. Provisional Application No. 62/982,035, filed on Feb. 26, 2020, which is hereby incorporated by reference in its entirety.

BACKGROUND

Autonomous vehicles and semi-autonomous vehicles leverage machine learning—specifically deep neural networks (DNNs)—to analyze the road surface as a vehicle is driving in order to guide the vehicle's position with respect to road boundaries, lanes, road debris, road barriers, road signs, and the like. For example, DNNs may be used for traditional hazard detection, such as the detection of road debris (e.g., animals, cones, construction material) in the oncoming portion of a road as an autonomous vehicle is driving, which may lead to an adjustment in the autonomous vehicle's position (e.g., maneuvering to avoid driving over a traffic cone in the middle of the road). However, training DNNs to accurately detect objects on the road requires a massive amount of training data, computational power, and human time and effort. Moreover, capturing real-world image data of roads with objects—such as debris—is a challenging task, as debris is generally avoided by drivers and/or quickly removed from the roadway. However, in order to sufficiently train a DNN, thousands of training data instances are required. As such, there is a discrepancy between the amount of useful training data including debris that can be collected and the amount of training data to accurately train a DNN to detect road debris.

Additionally, conventional systems often rely on real-world data captured by physical vehicles driving around in a variety of environments to generate training data for DNNs. However, this methodology is problematic for a number of reasons. For instance, physical vehicles have limited opportunities to encounter roadways with road objects that must be navigated around or driven over because communities prioritize clearing objects, which pose a dangerous risk to drivers, from the road. However, purposely setting up roadways, especially highways, with foreign objects in the path of vehicles is both difficult and dangerous. Likewise, testing DNNs for accuracy in detecting objects in order to decide whether to drive over or navigate around an object in such real-world environments is time-consuming and burdensome. Yet, automobile manufacturers are unlikely to release autonomous vehicles using DNNs until high levels of safety and accuracy are achieved. As a result, competing interests of safety and accuracy make generating a practical, sound, and reliable autonomous driving system increasingly challenging.

Some traditional DNNs detect objects—such as debris—that are members of a predefined list of object classes that the DNN is trained on (e.g., some DNNs are trained to detect cars, pedestrians, cyclists, etc.). However, these methods typically have difficulties detecting arbitrary objects that are not a member of any of their list of classes. For instance, a DNN designed to detect cones cannot detect ladders from an image. This severely limits the applications for these approaches, as every time there is a need to detect a new object type, developers will have to collect datasets and design new algorithms (and/or train new DNNs). This problem is exacerbated for debris detection as the number of different types of debris is potentially endless, so training a DNN to detect some debris types but not others may reduce the efficacy of the system in identifying potentially dangerous objects on the driving surface.

SUMMARY

Embodiments of the present disclosure relate to object detection using image alignment for autonomous machine applications. Systems and methods are disclosed that use a geometric approach to detect objects on a road surface and can detect objects above a threshold size. For example, and in contrast to conventional systems, such as those described above, the systems and methods of the present disclosure include a geometric approach to detect objects on a road surface, which largely expands the scope of its application. The proposed approach can detect any objects that are above a threshold size—e.g., a predetermined threshold can be as small as a few centimeters in size for objects within a distance of ten meters from the vehicle.

In some embodiments, the method for detecting arbitrary objects may include three stages or operations: region of interest (ROI) initialization, image alignment with homography estimation, and hazard detection and tracking. The first stage, ROI initialization, may begin with extracting a ROI from an image for further processing. During the next stage of image alignment with homography estimation, sparse features in a determined ROI may be extracted and tracked to estimate an initial homography between two frames at a predetermined interval. In some embodiments, tracking maps may be used to track sparse features—e.g., because it may be difficult to track individual points on a road surface due to a sparsity of observable texture. As such, by limiting the search space to a local image patch, the system may better be able to track sparse features reliably. During image alignment with homography estimation, a homography estimation between a pair of input images according to the ROI may be determined and then aligned images can be output based on the estimated homography. The third stage, hazard or object detection and tracking, may use the aligned images and calculate a "disparity image," obtain per-frame object detection results, and perform additional tracking with temporal analysis. As a result, road hazards may be identified without requiring prior knowledge or training with respect to each particular type of road debris that may be encountered by a vehicle.

BRIEF DESCRIPTION OF THE DRAWINGS

The present systems and methods for object detection using image alignment for autonomous machine applications are described in detail below with reference to the attached drawing figures, wherein.

DETAILED DESCRIPTION

Figure 1:
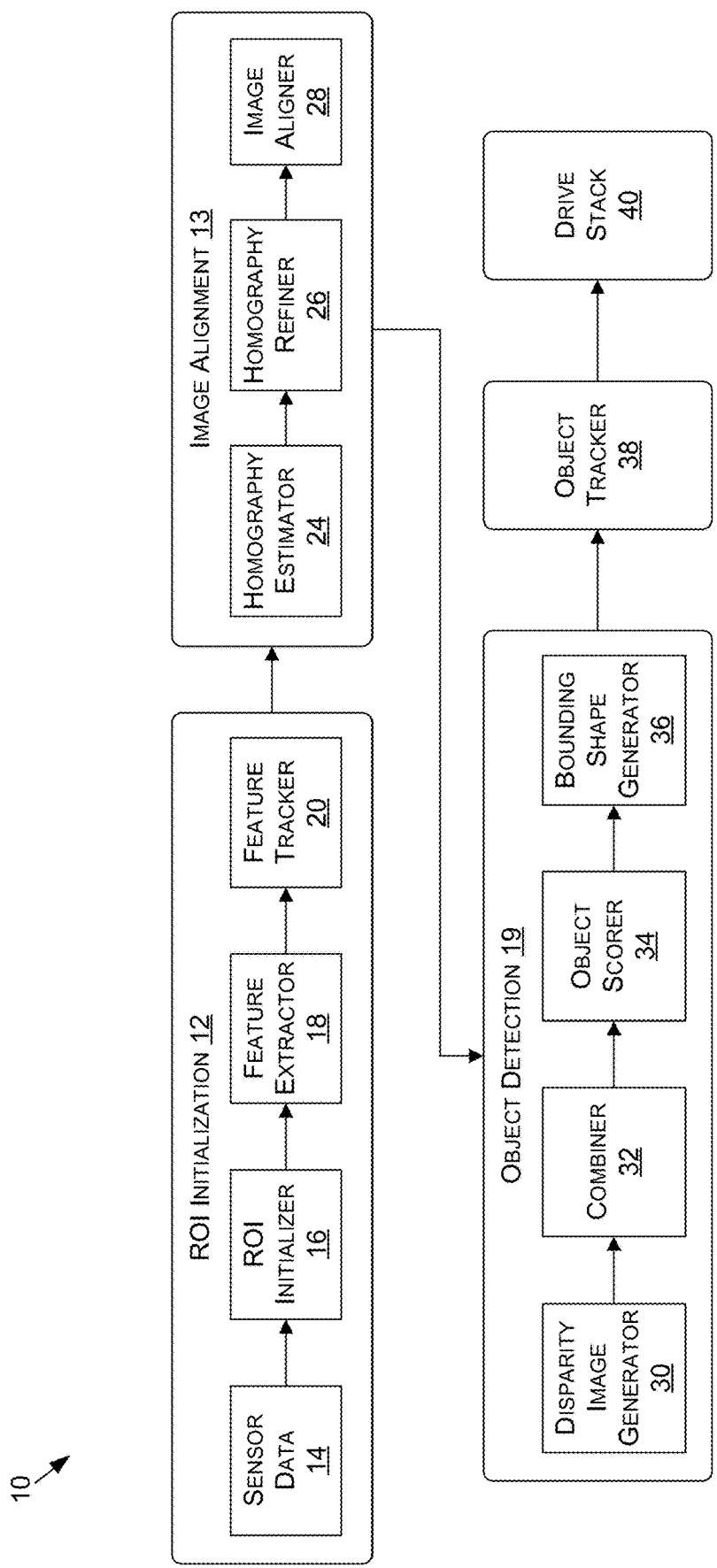
FIG. 1 is a data flow diagram illustrating an example process for object detection using image alignment for autonomous driving applications, in accordance with some embodiments of the present disclosure.

Systems and methods are disclosed related to object detection using image alignment for autonomous machine applications. Although the present disclosure may be described with respect to an example autonomous vehicle 900 (alternatively referred to herein as "vehicle 900" or "ego-machine 900," an example of which is described with respect to FIGS. 9A-9D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to object tracking for autonomous driving, this is not intended to be limiting, and the systems and methods described herein may be used in augmented reality, virtual reality, mixed reality, robotics, security and surveillance, autonomous or semi-autonomous machine applications, and/or any other technology spaces where object tracking may be used.

In contrast to conventional methods and systems, such as those described herein, the method of the present disclosure discloses a geometric approach to detect objects on a road surface, which largely expands the scope of its application. The proposed approach can detect any objects that are above a threshold size—e.g., a predetermined threshold can be as small as a few centimeters in size for objects within a distance of ten meters from the vehicle. The method for detecting arbitrary objects may include three stages or operations: region of interest (ROI) initialization, image alignment with homography estimation, and hazard detection and tracking.

In example embodiments, the first stage, ROI initialization, begins with extracting a ROI from an image for further processing. For example, in some embodiments, the ROI extracted may be implemented using a local trapezoid on the surface of a road in an image captured using a sensor (such as a camera) facing the direction of travel of an ego-machine. In some embodiments, the ROI can be obtained using a heuristic and/or using freespace estimation (e.g., using a free-space boundary output using a machine learning model or deep neural network (DNN) to identify suitable portions of a driving surface for ROI initialization). Additionally, a new ROI may be initialized at predetermined intervals, such as each time the ROI is within a threshold distance to the bottom of an image frame, after some number of frames, and/or at another interval.

During the next stage of image alignment with homography estimation, sparse features in a determined ROI may be extracted and tracked to estimate an initial homography between two frames at a predetermined interval. To extract features, locations may be determined using image gradient information. For example, features may be extracted from pixel locations with larger/higher gradient values. As such, one or more pixels of a first color value surrounded by pixels of a second color value that is greater than a threshold difference to the first color value may be identified as usable features for feature tracking due to the visual contrast of the one or more pixels with respect to the surrounding pixels. In one or more embodiments, the feature locations may be refined by a non-maximum suppression approach to avoid features that are spatially proximate and to distribute features across the ROI, rather than being concentrated on any specific area. Additionally, in embodiments, road profile and lane geometry can be used to guide feature matching. For example, an approximate lane geometry may be precomputed using lane detection and/or freespace estimation and then features may be extracted according to estimated scales. By sampling many of these features from a local ROI, reliable tracking results can be generated.

Further, embodiments of the present disclosure may track sparse features by utilizing tracking maps. For example, it may be difficult to track individual points on a road surface due to a sparsity of observable texture(s). However, by limiting the search space to a local image patch, the system may better be able to track sparse features reliably. For example, in embodiments, tracking maps (e.g., heat maps) generated using a local search are able to track feature points more reliably. Instead of searching the full image space, by using either ego motion information of the vehicle, or a motion pattern inferred from previous video frames, the system is guided to where a feature point may appear in the next frame and searches it only in the smaller area. Accordingly, the algorithm used will not be confused by other feature points if searching in the full image space, especially when the feature points are on the road surface which look very similar to each other.

During image alignment with homography estimation, a homography estimation between a pair of input images according to the ROI may be determined and then aligned images can be output based on the estimated homography. For example, during initial homography estimation, a random sample consensus (RANSAC) operation may be executed to estimate homography between two or more images using feature match data of the previously identified features. Another embodiment of initial homography estimation is to use vehicle ego motion, as the ego motion can be obtained from other sensors (e.g. GPS, IMU, etc.) and transform the information back to image space for a homography. Another embodiment of initial homography estimation is to infer it from previous frames. When the frame rate is sufficiently high (>30 fps), vehicle motion would not change substantially within a few frames, and the similarities of homographies from previous frames can be used to infer the current one. When homography refinement occurs, homography information already obtained can be used as an initialization, and then may be refined by applying optical flow estimation to the homography information. For example, the optical flow estimation may include applying the Lucas-Kanade method to get a more accurate homography at a sub-pixel level of alignment.

The third stage—hazard or object detection and tracking—may use the aligned images and calculate a "disparity image," obtain per-frame object detection results, and perform additional tracking with temporal analysis. In embodiments, once image alignment is completed, a disparity image is obtained and used for computing per-frame object detection results. This process includes, but is not limited to, the steps of binarization, connected component analysis, object scoring, and computing a final bounding box. Once the image has been aligned, the difference between two images is computed to generate an "disparity image."

In one or more embodiments, the disparity image is a binary detection map where pixels with difference values (e.g., differences in pixel values between the first image and the second image after alignment) determined to be larger than a predetermined threshold difference value are encoded with a first value (e.g., 1) and each other pixel below the threshold are encoded with a second value (e.g., 0). The pixels with the first value, and thus the threshold difference, may be determined to be associated with objects (e.g., debris, in embodiments). The pixels from the binary or disparity image may be converted to different entities or groups of pixels using connected component analysis (or another clustering or grouping algorithm) in which groups of adjacent pixels having similarly encoded values may be associated with one another and marked or tagged with a similar identifier. Using this approach, it is possible to have groups of connected components that are not actually associated with a real object. As such, the size and disparity values resulting from the connected component analysis may be aggregated to calculate a score for each of the groups of connected components and those groups with the larger scores may be selected to be the real object detections. In embodiments, bounding shapes (e.g., a box) may be used to illustrate the results for object detection. To generate the bounding shapes, an algorithm may be used to determine the smallest bounding shape that contains each of the pixels within the group of the connected components as the final bounding shape for the corresponding object detection. The bounding shape may be tracked from frame to frame using temporal filtering to remove outliers and thus to output more stable results.

Additionally, because of the potential for many false positive pixels, in some embodiments, tracking can filter directly on the "disparity images" to remove such "disparity images." In other embodiments, a data-driven approach can be employed to generate the detection bounding boxes. The "disparity image" can be considered as features, and bounding boxes are labels. While more and more data can be collected, machine learning-based methods (e.g., neural networks) can be used to learn how to output detection bounding boxes from "disparity images."

As such, and at a high level, aspects herein are directed to systems and methods for object detection comprising tracking a set of points within a region of interest between a first frame and a second frame that is captured after the first frame. Based upon the tracking, a difference in location between the set of points in the first frame and the second frame is determined. The first frame is then aligned with the second frame based at least in part on the difference in location and first pixel values of the first frame are compared with second pixel values of the second frame to generate a disparity image including third pixels, wherein the third pixels include one or more subsets of third pixels. One or more subsets of third pixels of the disparity image having disparity values above a first threshold value are combined. Then, the one or more subsets of the third pixels are scored based at least in part on a number of pixels in each of the one or more subsets of the third pixels and associated disparity values for each of the pixels of the one or more subsets of the third pixels. Subsequently, a bounding shape is generated for each of the one or more subsets of the third pixels.

In other aspects, systems and methods for object tracking comprising tracking a set of points within a ROI between a first frame and a second frame captured after the first frame are disclosed. The first frame is aligned with the second frame based at least in part on a difference in location between the set of points in the first frame and the second frame. Then, first pixel values of the first frame are compared with second pixel values of the second frame to generate a disparity image including third pixels and one or more subsets of the third pixels of the disparity image having disparity values above a first threshold value are combined. A bounding shape is generated for at least one of the one or more subsets of the third pixels, where the bounding shape may corresponds to the detected object—e.g., road debris or hazards.

Object Detection Using Image Alignment

Now referring to FIG. 1, which depicts a data flow diagram illustrating an example process 10 for object detection using image alignment in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the process 10 may be executed using one or more of the components, features, and/or functionality described with respect to autonomous vehicle 900 of FIGS. 9A-9D, example computing device 1000 of FIG. 10, and/or example data center 1100 of FIG. 11.

At a high level, the process 10 may include region of interest (ROI) initialization 12, image alignment 13, object detection 19, object tracking using an object tracker 38, and/or performing one or more operations using an autonomous machine driving stack ("drive stack") 40 based on the object detection 19 and/or object tracking outputs. The process 10 may include ROI initialization 12 using sensor data 14 (e.g., received and/or generated sensor data using one or sensors of the vehicle 900), ROI initializer 16, and/or feature extractor 18. For example, the sensor data 14 may include sensor data generated from any number of sensors of the vehicle 900—e.g., LiDAR sensors 900, RADAR sensors 960, cameras 968, 970, 972, 974, 998, ultrasonic sensors 962, etc. As such, during ROI Initialization 12 a sensor data representation (e.g., a camera image, a projection image (e.g., a LiDAR range image), etc.) is generated and/or received and a ROI is extracted for further processing.

In some embodiments, the sensor data 14 may include data representative of images of a field of view of one or more cameras of a vehicle 900, such as stereo camera(s) 968, wide-view camera(s) 970 (e.g., fisheye cameras), infrared camera(s) 972, surround camera(s) 974 (e.g., 360 degree cameras), long-range and/or mid-range camera(s) 998, and/ or other camera type of the autonomous vehicle 900 (FIGS. 9A-9D). In some examples, the sensor data 14 may be captured by a single camera with a forward-facing, substantially centered field of view with respect to a horizontal axis (e.g., left to right) of the vehicle 900. In a non-limiting embodiment, one or more forward-facing cameras may be used (e.g., a center or near-center mounted camera(s)), such as a wide-view camera 970, a surround camera 974, a stereo camera 968, and/or a long-range or mid-range camera 998. The sensor data 14 captured from this perspective may be useful for perception when navigating—e.g., within a lane, through a lane change, through a turn, through an intersection, etc.—because a forward-facing camera may include a field of view (e.g., the field of view of the forward-facing stereo camera 968 and/or the wide-view camera 970 of FIG. 9B) that includes both a current lane of travel of the vehicle 900, adjacent lane(s) of travel of the vehicle 900, and/or boundaries of the driving surface. In some examples, more than one camera or other sensor (e.g., LIDAR sensor, RADAR sensor, etc.) may be used to incorporate multiple fields of view or sensory fields (e.g., the fields of view of the long-range cameras 998, the forward-facing stereo camera 968, and/or the forward-facing wide-view camera 970 of FIG. 9B).

In some examples, the sensor data 14 may be captured in one format (e.g., RCCB, RCCC, RBGC, etc.), and then converted (e.g., during pre-processing of the image data) to another format. In some other examples, the sensor data 14 may be provided as input to an image data pre-processor (not shown) to generate pre-processed image data. Many types of images or formats may be used as inputs; for example, compressed images such as in Joint Photographic Experts Group (JPEG), Red Green Blue (RGB), or Luminance/ Chrominance (YUV) formats, compressed images as frames stemming from a compressed video format (e.g., H.264/ Advanced Video Coding (AVC), H.265/High Efficiency Video Coding (HEVC), VP8, VP9, Alliance for Open Media Video 1 (AV1), Versatile Video Coding (VVC), or any other video compression standard), raw images such as originating from Red Clear Blue (RCCB), Red Clear (RCCC) or other type of imaging sensor. In some examples, different formats and/or resolutions could be used for training the machine learning model(s) 104 than for inferencing (e.g., during deployment of the machine learning model(s) 104 in the autonomous vehicle 900).

Once the sensor data is generated and/or received, the ROI initializer 16 may determine the ROI using the sensor data 14. The ROI initializer 16 may initialize the ROI with respect to a first frame, set a left boundary and a right boundary of the ROI (e.g., using a heuristic and/or freespace estimation), and may set a top boundary of the ROI according to a first distance threshold and/or a bottom boundary of the ROI according to a second distance threshold.

In some embodiments, the ROI can be obtained, initialized, or generated using a heuristic and/or using freespace estimation (e.g., using a free-space boundary output using a machine learning model or deep neural network (DNN) to identify suitable portions of a driving surface for ROI initialization). For example, where freespace estimation is used, object detection may be used to determine freespace boundaries of a driving surface, and the freespace boundaries may be used to help define the ROI—e.g., because the freespace may limit the potential locations of the ROI to the driving surface. As such, freespace output may be used to determine the drivable surface for the vehicle 900 and to delineate the driving surface from other portions of the environment. As a result, the left and right boundary of the driving surface may then be used to establish the left and right boundaries of the ROI. As another example, if the ROI identified is a trapezoid in which one lane of a road is included, the left and right boundaries for the ROI may correspond to the lane lines.

In general, once the freespace is determined, a bounding shape for the ROI can be generated or initialized and tracked frame by frame—e.g., until another initialization is performed after some interval, after a distance is traveled, etc. For example, if an ROI is identified and located 50 feet from a car at frame one and then 40 feet from a car at frame ten, the rotation and/or translation of the vehicle from where it was originally located in frame one (how far to the right/left, forward, and any potential rotation) may be determined. Since the vehicle moved 10 feet between frame one and frame ten in this example, the ROI may be moved accordingly from the first frame to the tenth frame. In some embodiments, optical flow may be used in order to track a set of pixels and determine where they have moved from frame to frame, and then may be used to reinitialize the ROI. A new or updated ROI may be initialized at predetermined intervals, such as each time the ROI is within a threshold distance to the bottom of an image frame, after some number of frames, and/or at another interval.

The feature extractor 18 may extract the pixel values for features that are within a designated ROI—e.g., the feature extractor 18 may determine information about the pixels with in the ROI after initiation by the ROI initializer 16. Example features may include, but are not limited to, lane lines, spots or stains on that surface, texture differences on the surface, barriers, etc. The feature extractor 18 may identify the same features that were identified in the first image for a determined number of additional frames. For example, once the ROI is initialized for a first frame and a set of points or features are identified within the first ROI of the first frame, one or more of the same set of points or features may be tracked across frames. In some embodiments, gradient values corresponding to the first pixels of the first frame within the ROI are identified and, based on the gradient values, the set of points to track may be determined—e.g., pixels within the ROI having gradient values above a threshold gradient value may be selected for tracking.

Figure 2A:
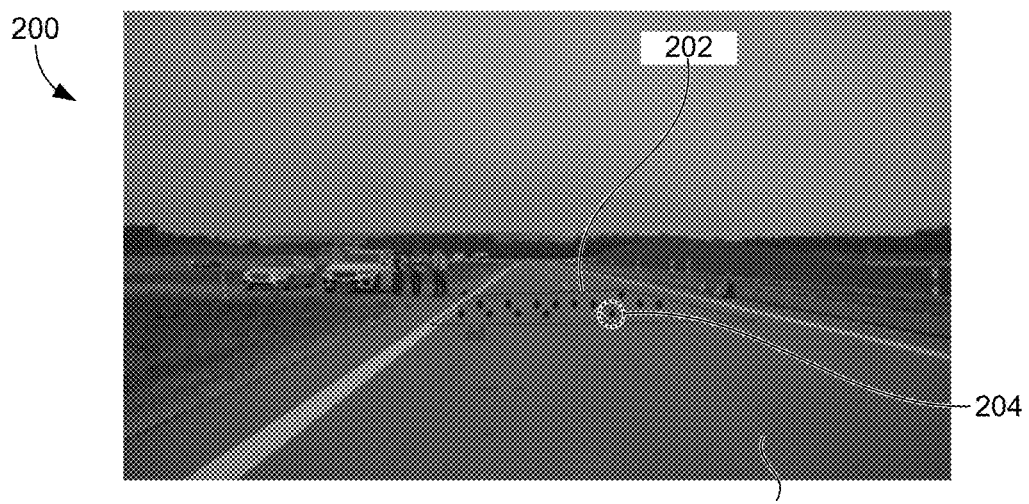
FIG. 2A is an illustration of an example initial homography estimation for image alignment, in accordance with some embodiments of the present disclosure.

For example, if the feature extractor 18 identifies lane lines in the region of interest, the feature extractor 18 may locate the same lane line—or point(s) thereon—for each additional frame analyzed. If the sensor data 14 included a hundred different image frames, the feature extractor 18 may identify some or all of the same set of features within the ROI for all hundred frames. In FIG. 2A, for example, the ROI initializer 16 may have determined a region of interest (ROI) 202, which is outlined as a trapezoid. Within the ROI 202 are several features 204 which are extracted by feature extractor 18. The features 204 may be extracted from pixel locations where the respective pixel values indicate larger gradient values. As such, in some embodiments, the features to be tracked and their locations, may be determined using the image gradient such that the features are extracted from pixel locations with larger gradient values. The locations may be refined using a non-maximum-suppression scheme to avoid features that are spatially nearby and to distribute the features across the ROI (rather than concentrated to any specific area). Additionally, the features detected may be assigned descriptions or labels based on information extracted from the ROI, and the descriptions or labels may be stored to aid in tracking the features across subsequent frames.

Figure 2B:
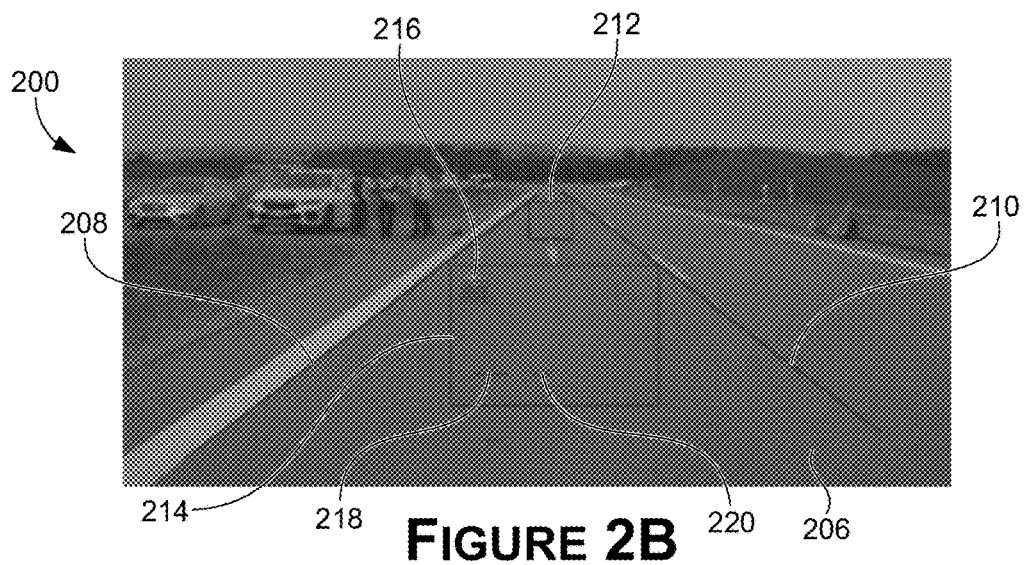
FIG. 2B is an illustration of an example of feature matching for the illustration of FIG. 2A, in accordance with some embodiments of the present disclosure.

According to embodiments, road profile and lane geometry may be used to guide feature matching. For example, FIG. 2B illustrates feature mapping in which an approximate lane geometry may be pre-computed using lane detection and/or freespace estimation. The features may be extracted according to estimated scales. For example, as the vehicle moves, the ROI will increase in size from frame to frame as the vehicle approaches the ROI. As such, knowledge of road profiles, lane geometry, and/or ego-motion may be used to adjust the size of the ROI, and also the size of the features therein, such that the feature tracking is more accurate. For example, where a feature accounts for two pixels at initialization of the ROI, the same feature may account for twenty pixels ten frames later as the vehicle approaches the ROI. As such, the road profile, lane geometry, and/or ego-motion may be used to account for these changes when tracking features.

With respect to FIG. 2B, FIG. 2B illustrates a scale-guided matching using the road profile and lane geometry. Two boxes are shown, box 212 (corresponding to a first ROI) and box 214 (corresponding to second ROI), which includes features 216, 218, and 220. Each of boxes 212 and 214 and the features 216, 218, and 220 are projected to a same frame (e.g., the box 214 corresponding to a later frame is projected to an earlier frame including the box 212) to illustrate the change in size of the ROI and features across frames. The features that are to be tracked may have a first size or number of pixels in a first frame and may have a second larger size and a larger number of pixels in a second frame. In box 216, the ROI is tracked to find matches for the features identified in the smaller box 212 (it should be noted that the boxes 212 and 214 would, in practice, be associated with different frames, and the features would include the same features for tracking across frames, the illustration of FIG. 2B is to indicate the changes in size of ROIs and features that scale-guided matching can help account for).

During the feature tracking process, the feature extractor 18 may extract, as non-limiting examples, as few as 20 or as many as 200 features within each image. For each frame where tracking is performed, a bounding shape (e.g., box 212 and/or 214) may be generated to indicate the ROI, and the ROI may include more than one feature that will be compared to a future frame.

Figure 7:
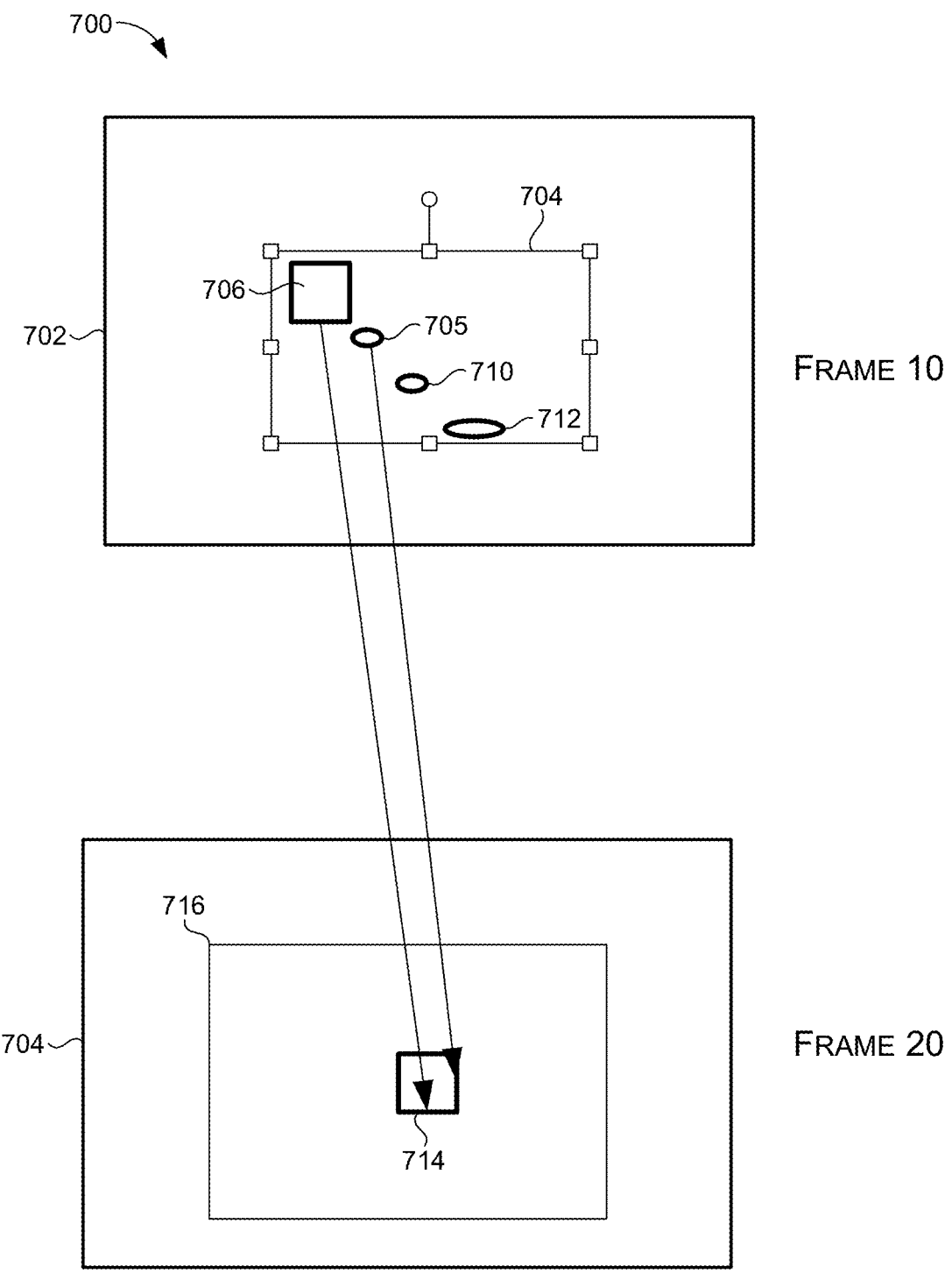
FIG. 7 is an illustration depicting object tracking and bounding shape generation, in accordance with some embodiments of the present disclosure.

As another example, FIG. 7 illustrates tracking of features and ROIs across frames. Two frames are shown illustrating the movement of objects within the bounding box and ROI. Frame 10, labeled as 702, shows the movement of objects 706, 705, 710, and 712 within the bounding box 704 in frame 10. The features are tracked between the frames and the ROIs are adjusted accordingly. For example, the movement of feature 706 and 705 are tracked between Frame 10 and Frame 20. As an example, a new ROI is initialized when the ROI is within a threshold pixel distance to a bottom of a frame or after the ROI has been used for a threshold number of frames.

Figure 2C:
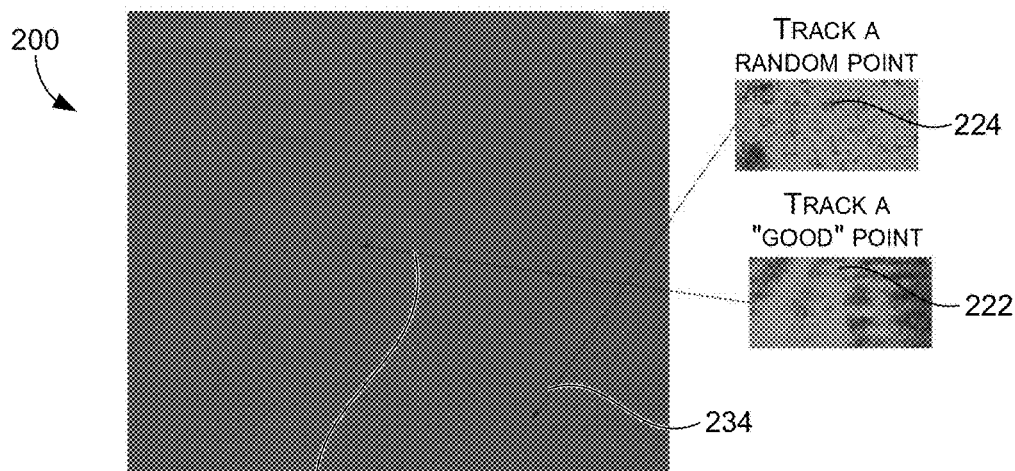
FIG. 2C is an illustration of feature mapping, in accordance with some embodiments of the present disclosure.

Generally, it may be difficult to track individual points on a road surface due to a sparsity of observable textures. However, by limiting the search space to a local image patch, the sparse features can be reliably tracked. Two heat tracking maps are shown in FIG. 2C. The tracking maps are colored using a "heat map" scheme such that higher values are represented darker and lower values are represented lighter. For features that are tracked well (e.g. a good feature), normalized cross correlation values are consistently distinguishable from the background. The tracking of the random point 224, also shown in FIG. 2C, is less clear because there are many similar points in the vicinity of the point 224, indicating a feature that is not tracked as well. By sampling mostly "good features" from a local ROI, reliable tracking results are obtained. The point 222 which is shown as a "good" point has a higher gradient as compared to surrounding pixels, and is around the lane marking, while random points, such as random point 224, lack texture in the imaging. If a good point, such as point 222 in FIG. 2C is identified, it indicates a match in the ROI in the next frame, so the use of good points, or points with higher gradient values relative to surrounding pixels, result in more accurate feature tracking results.

After ROI initialization 12, image alignment 13 may be performed using the outputs of the feature tracker 20. Image alignment 13 may be executed using a homography estimator 24, homography refiner 26, and/or an image aligner 28. The homography estimator 24 may estimate and tracks sparse features in the ROI to estimate an initial homography between at least two frames with some interval. For example, the feature tracking information indicating differences in locations of features between two frames in a set may be used to estimate an initial homography between the frames. For example, if sensor data 14 is obtained while the vehicle is moving, frame t, frame t+0, t+1, t+2 and so on can be used to estimate the homography.

Figure 3A:
FIG. 3A is an illustration of feature matching for another example set of images using RANSAC homography estimation, in accordance with some embodiments of the present disclosure.
Figure 3B:
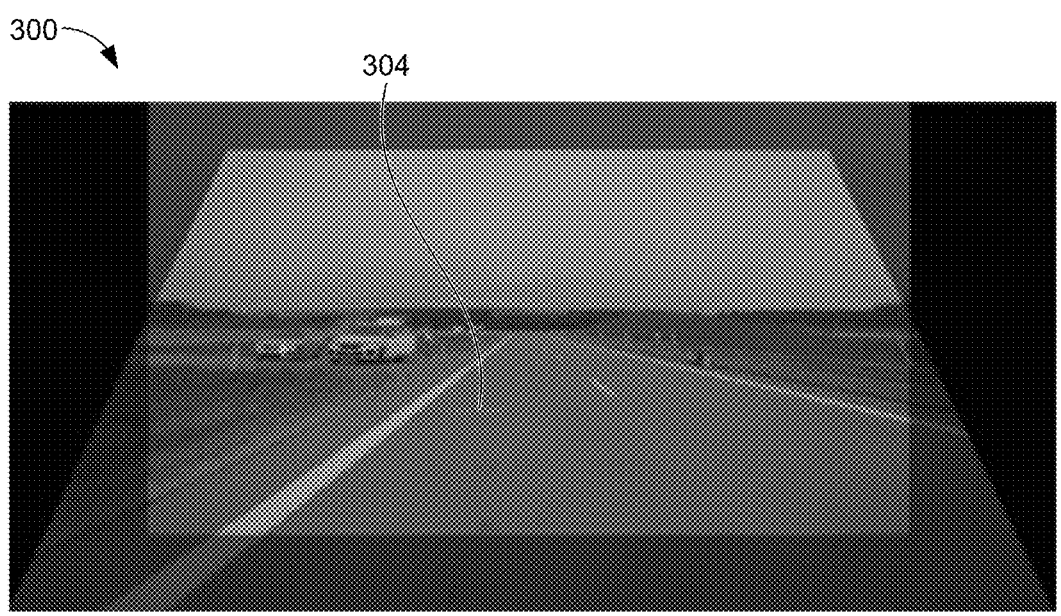
FIG. 3B is an illustration of image alignment of two frames of the image of FIG. 3A, in accordance with embodiments of the present disclosure.

In some embodiments, a random sample consensus ("RANSAC") method is employed to estimate the homography between two images using feature match data. When RANSAC homography is used, vectors may be generated that illustrate features from a determined number of frames. For example, if twenty vectors are generated, it indicates that there are twenty features being tracked across frames. The image frames are aligned using feature tracking vectors with the RANSAC algorithm to generate an estimated homography—e.g., to rectify or convert the frames to a same image plane. An example of the use of RANSAC homography estimation is shown in FIG. 3A, which depicts several vectors, such as vector 302. For example, the vectors 302 of FIG. 3B may indicate the movement of features from box 212 to box 214 of FIG. 2B. As such, the vectors 302 may indicate a determination of the difference in location of the set of points or features across frames. With reference to FIG. 3B, FIG. 3B illustrates the image alignment of two example frames from FIG. 3A. The two frames are aligned by the image aligner 28 and then blended together for visualization. In some embodiments, not all of the matches are corrected and match errors may be removed by applying RANSAC to obtain reasonable homography estimation results.

Once an initial homography is determined, the homography refiner 26 may refine the homography estimation. For example, the homography refiner 26 may use the homography obtained by the homography estimator 24 to get more accurate homography for a sub-pixel level image alignment. As such, homography information from the homography estimator 24 may be refined by applying optical flow estimation and/or the Lucas-Kanade method to get a more accurate homography. The process may include performing an optical flow analysis on the first frame and the second frame after the aligning of the first frame and the second frame to generate an updated alignment of the first frame and the second frame.

Figure 4A:
FIG. 4A is an illustrate of the implementation of the Lucas-Kanade method without initial homography estimation, in accordance with embodiments of the present disclosure.
Figure 4B:
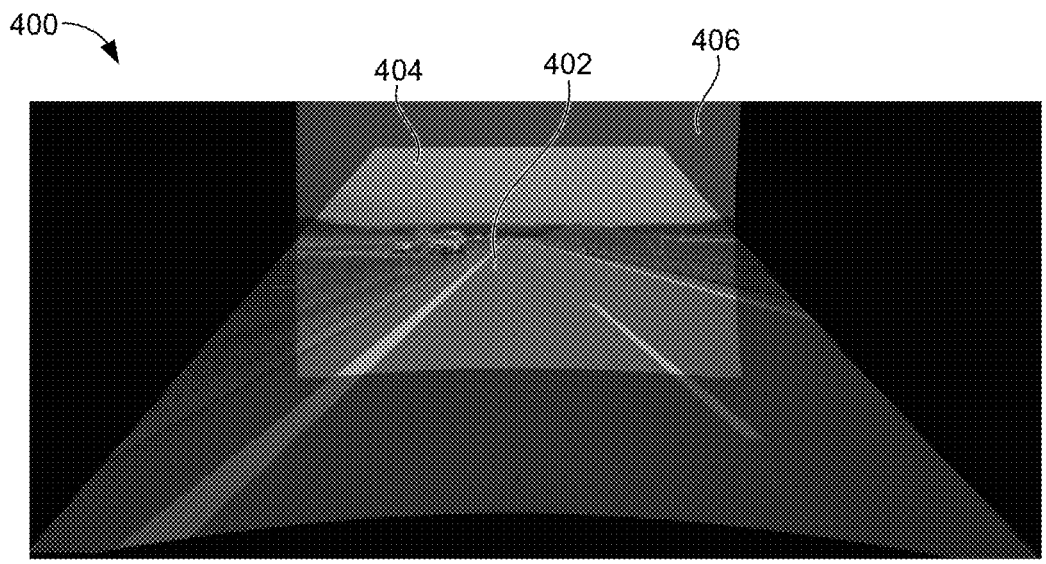
FIG. 4B is an illustration of the implementation of the Lucas-Kanade method with initial homography estimation, in accordance with embodiments of the present disclosure.

In some embodiments, the homography refiner 26 may use the Lucas-Kanade method in order to obtain more accurate homography. The Lucas-Kanade method is a differential method for optical flow estimation that assumes the flow is essentially constant in a social neighborhood of the pixel under consideration. By combining information from several nearby pixels, the method can resolve ambiguity of the optical flow equation. With reference to FIG. 4A, a road surface 400 is illustrated depicting the results of using the Lucas-Kanade method without initial homography estimation and image alignment. By contrast, FIG. 4B illustrates utilizing the Lucas-Kanade method with initial homography estimation. As shown, the results in FIG. 4B, using the Lucas-Kanade method with the initial homography estimation is more clear and accurate. For example, in FIG. 4A, the cone 402 is shown, but is not well aligned and clear. However, in FIG. 4B, once the Lucas-Kanade method is used with initial homography estimation, the cone 402 is significantly clearer and better aligned. Further, in FIG. 4B, two frames 404 and 406 are aligned and blended together for the better visualization of cone 402.

Once the homography refiner 26 refines the homography, the image aligner 28 aligns the results of one or more frames. For example, the image aligner 28 may align the results of two frames, which are then blended together for visualization. In embodiments, once image alignment 28 is completed, a disparity image is generated and used for computing per-frame object detection results. This process may include, but is not limited to, binarization, connected component analysis, object scoring, and computing a final bounding shape. Once the image has been aligned, the difference between two images may be computed to generate a "disparity image."

For example, a disparity image generator 30 may generate a disparity image used to get per-frame object detection results. The disparity image generator 30 may use two frames to produce a "disparity image," where the pixels within the disparity image that are not on the ground plane may have larger errors. In one or more embodiments, the disparity image is a binary detection map where pixels with difference values (e.g., differences in pixel values between the first image and the second image after alignment) determined to be larger than a predetermined threshold difference value are encoded with a first value (e.g., 1) and each other pixel below the threshold are encoded with a second value (e.g., 0). The pixels with the first value, and thus the threshold difference, may be determined to be associated with objects (e.g., debris, in embodiments). The pixels from the binary or disparity image may be converted to different entities or groups of pixels using connected component analysis (or another clustering or grouping algorithm) in which groups of adjacent pixels having similarly encoded values may be associated with one another and marked or tagged with a similar identifier. Using this approach, it is possible to have groups of connected components that are not actually associated with a real object. As such, the size and disparity values resulting from the connected component analysis may be aggregated to calculate a score for each of the groups of connected components and those groups with the larger scores may be selected to be the real object detections. In embodiments, bounding boxes may be used to illustrate the results for object detection.

Once the disparity image is generated, the objects, which are represented by pixels, may be converted into different entities via the combiner 32 conducting, e.g., a connected component analysis. The combiner 32 may execute connected component analysis to convert objects in a binary detection map that are represented by pixels into different entities. The conversion groups adjacent pixels together and marks them with different identifiers, or IDs, such that the objects or hazards can be tracked over time.

Figure 6:
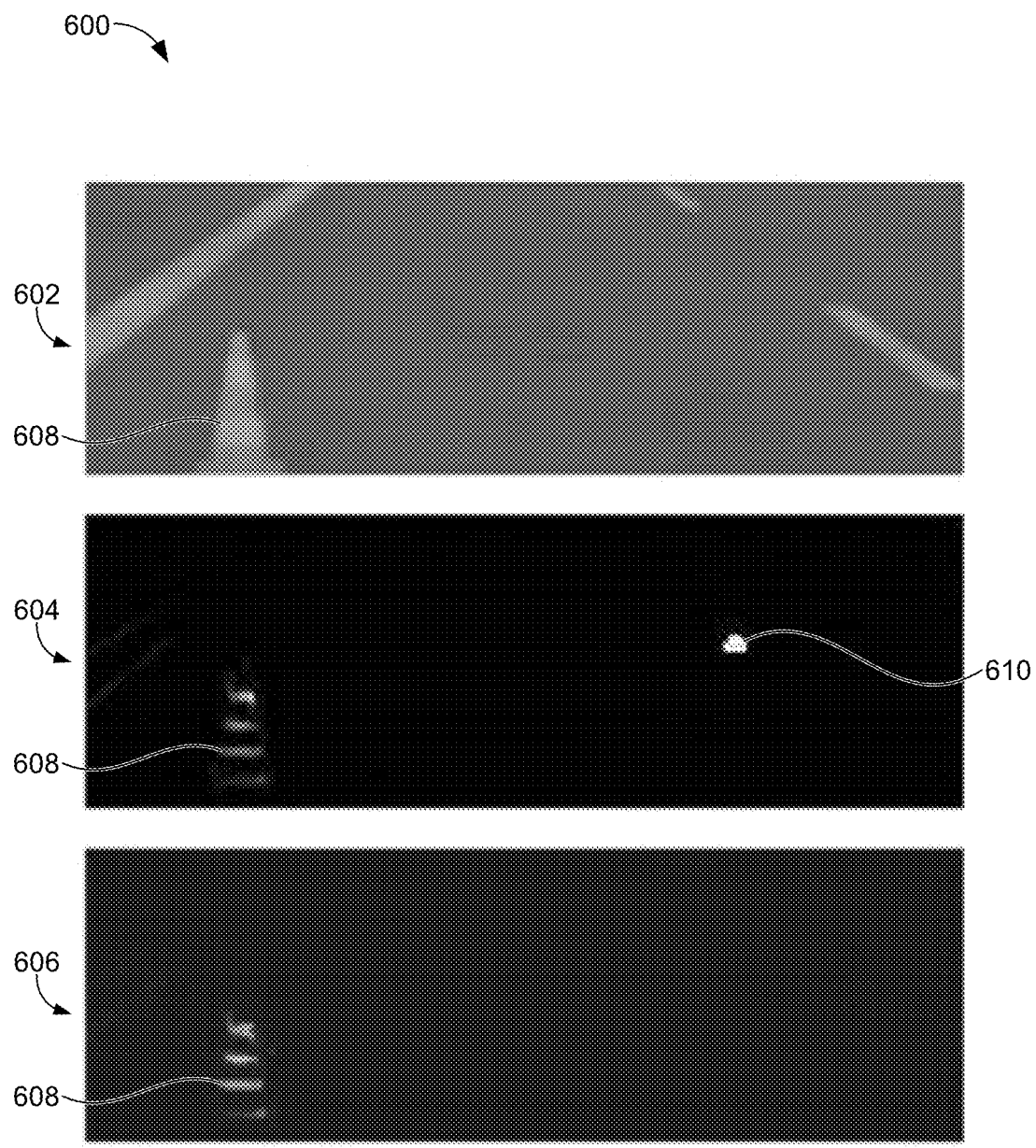
FIG. 6 is an illustration of using image alignment to perform object detection, in accordance with some embodiments of the present disclosure.

As shown in FIG. 6, a disparity image 600 is generated through binarization. In all three images, the cone 608 is shown. In accordance with embodiments, two (or more) input images are aligned using associated regions of interest identified and tracked within each of the images, and corresponding pixel values of each image are compared with each other. If the error (difference) between the pixel values is zero, then the area may be visualized or otherwise represented using the same or similar value(s) (e.g., as black as seen in image 604). If the error is above a threshold (e.g. 70%) then all pixels above the threshold will be visualized or otherwise represented using the same or similar value(s) (e.g., as white, as shown in image 602). Likewise, all pixel values that are below the threshold may be visualized or otherwise represented using the same or similar value (e.g., depicted as dark grey in image 606). In FIG. 6, the road hazard shown is cone 608. As such, through binarization and connected component analysis, the white pixels seen in images 604 and 606 are connected to illustrate the cone as the road hazard.

In further embodiments, the disparity images can be filtered directly using the input images to remove many of the false positive pixels. In other embodiments, a data-driven approach can be employed to generate the detection bounding shape. The "disparity image" can be considered as features, and bounding boxes are labels. While more and more data can be collected, machine learning-based methods (e.g., neural networks) can be used to learn how to output detection bounding shapes from "disparity images."

One or more embodiments may include further stages which can generate more information about the objects, such as distance and height. The height estimation can be obtained from dense optical flow as there is a linear relationship between the height of the object with the optical flow magnitude according to the location. The bounding shape provides the bottom and top positions of the objects, and optical flow values for these pixels can be directly employed to transform to the height of the object (1 pixel change in image will result in d/f height change in 3D, d: distance to object, f: focal length).

Since there may be several connected components, not all of them may be real objects on the road. Therefore, the size and disparity values resulting from the connected component analysis may be aggregated to calculate a score for each of the connected components. After the combiner 32 performs the connected component analysis, the object scorer 34 calculates a score for each of the connected components by aggregating the size and the disparity values. Those connected components with larger scores are determined to be the real object detections. Scoring each of the connected components is completed by multiplying the number of pixels in each of the one or more subsets of the pixels determined to be associated with a hazard by the associated disparity values for each of the pixels of the one or more subsets of the pixels.

To illustrate the results for object detection 19, a bounding shape generator 36 is used. The bounding shape generator 36 generates a bounding shape to illustrate the results for object detection. The shape generated can be any shape, including but not limited to a rectangular or square box. In order to convert the connected components to bounding shapes, an algorithm may be used to determine the smallest bounding shape that contains each of the pixels associated as a group using connected components (or another clustering or grouping algorithm) to be a final bounding box. The bounding shape generator 36 may generate a bounding shape that surrounds, for example, the cone 8 shown in FIG. 6. The bounding shape may be tracked from frame to frame, and may employ temporal filtering to remove outliers and thus to output more stable results.

Figure 5:
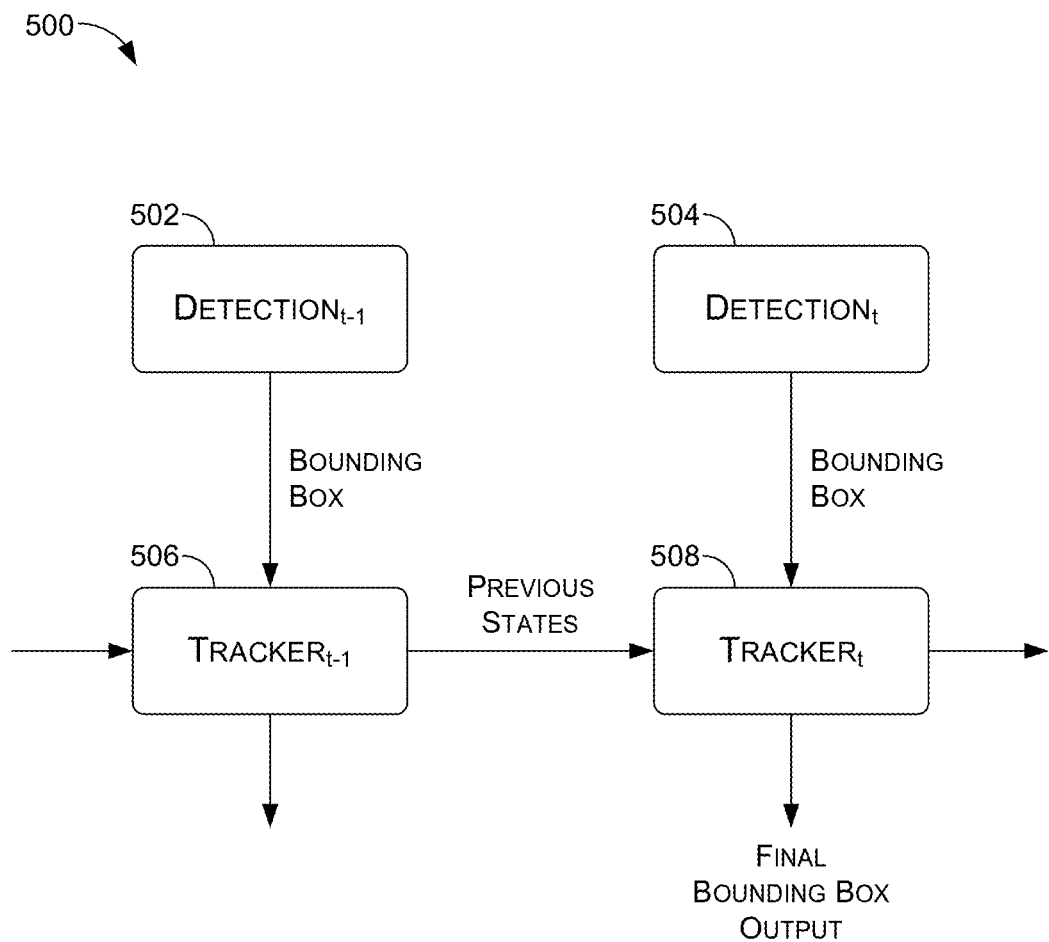
FIG. 5 is a block diagram illustration of a temporal analysis and object tracking of a set of images, in accordance with embodiments of the present disclosure.

Turning to FIG. 5, which illustrates a temporal analysis 500, the object tracker 38 employs temporal analysis to remove outliers and output more stable results. Because the per-frame object detection can be noisy, false positives may occur. Therefore, temporal analysis as shown in FIG. 5 may be employed to remove the outliers and output more stable results. For example, a first detection 502 of the objects is received to begin the ROI initialization 12. Based on the detection 502, the bounding shape generator 36 generates a first bounding shape. The object tracker 38 may track the object detected at 506 through to 508, or may use the bounding box from 506 to generate or update the bounding box at 508 to produce a final bounding box output.

Figure 8A:
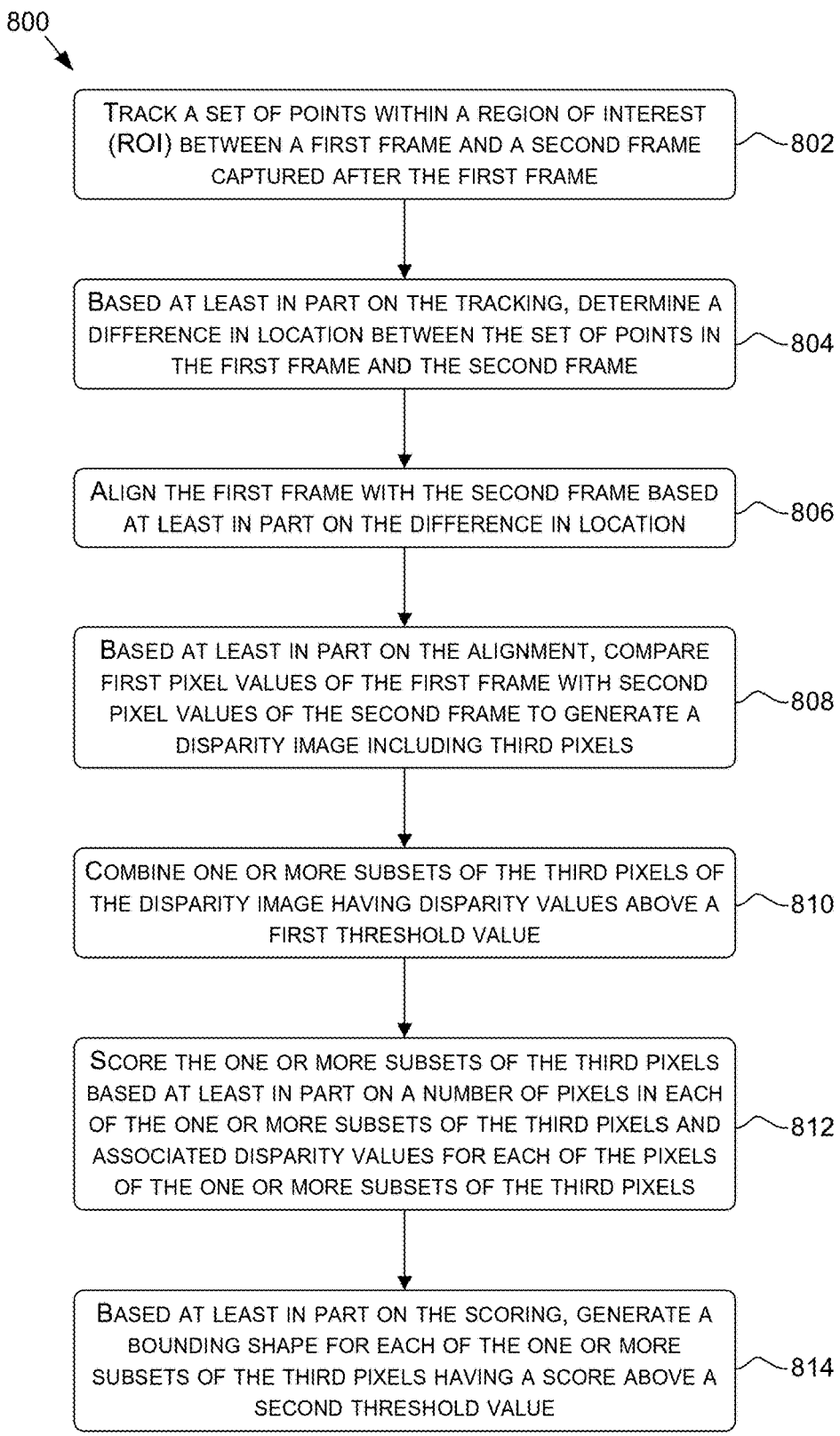
FIGS. 8A-8B are flow diagrams illustrating example methods for detecting objects using image alignment, in accordance with some embodiments of the present disclosure.
Figure 8B:
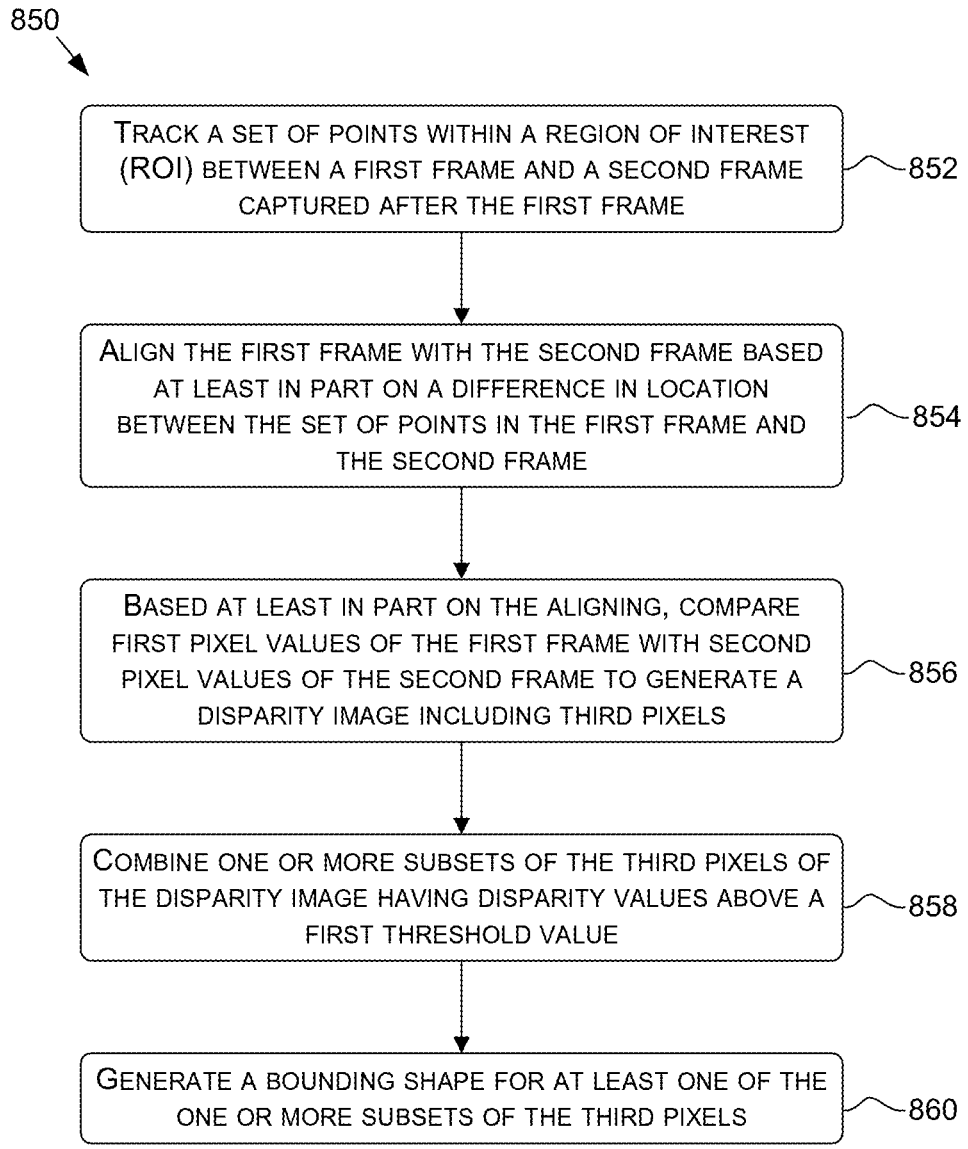

Now referring to FIGS. 8A-8B, FIGS. 8A-8B illustrate methods 800 and 850. Each block of methods 800 and 850 described herein, comprises a computing process that may be performed using any combination of hardware, firmware, and/or software. For instance, various functions may be carried out by a processor executing instructions stored in memory. The methods 800 and 850 may also be embodied as computer-usable instructions stored on computer storage media. The methods 800 and 850 may be provided by a standalone application, a service or hosted service (standalone or in combination with another hosted service), or a plug-in to another product, to name a few. In addition, method 800 and 850 are described, by way of example, with respect to the process 10 of FIG. 1. However, these methods 800 and 850 may additionally or alternatively be executed by any process and/or any one system, or any combination of processes and systems, including, but not limited to, those described herein.

FIG. 8A is a flow diagram showing a method 800 for generating a user profile associated with a user category, in accordance with some embodiments of the present disclosure. The method 800, at block 802, includes tracking a set of points within a ROI between a first frame and a second frame captured after the first frame. For example, the feature extractor 18 and/or the feature tracker 20 may be used to track one or more points corresponding to one or more features within one or more ROIs between frames.

The method 800, at block 804, includes determining a difference in location between the set of points in the first frame and the second frame based at least in part on the tracking. For example, the feature tracker 20, the homography estimator 24, and/or the homography refiner 26 may determine the differences in locations of the points or features across frames.

The method 800, at block 806, includes aligning the first frame with the second frame based at least in part on the difference in location. For example, the image aligner 28 may align the frames based on the differences in locations of features across frames.

The method 800, at block 808, includes comparing a first pixel value of the first frame with the second pixel values of the second frame to generate a disparity image including the pixels. For example, the disparity image generator 30 may generate an error or binary image based on the aligned frames.

The method of 800, at block 810, includes combining one or more subsets of third pixels of the disparity image having disparity values above a first threshold. For example, the combiner 32 may combine together pixels having similar disparity values to generate groups of pixels.

The method 800, at block 812, includes scoring the one or more subsets of the third pixels based at least in part on a number of pixels in each of the one or more subsets of the third pixels and associated disparity values for each of the pixels of the one or more subsets of the third pixels. For example, the object scorer 34 may score the groups of pixels.

The method 800, at block 814, includes generating a bounding shape for each of the one or more subsets of the third pixels having a score above a second threshold value. For example, the bounding shape generator 36 may generate a bounding shape corresponding to each group of pixels that has a score above a threshold—e.g., indicating that a hazard or object is located there.

Continuing to FIG. 8B, the method 850 for generating a user profile associated with a user category is depicted. The method 850, at block 852, includes tracking a set of points within a ROI between a first frame and a second frame captured after the first frame. For example, points corresponding to features may be tracked across frames using the feature tracker 20.

The method 850, at block 854, includes aligning the first frame with the second frame based at least in part on a difference in location between the set of points in the first frame and the second frame. For example, the image aligner 28 may align the first frame with the second frame based on the differences in locations between points or pixels corresponding to similar or the same features.

The method 850, at block 856, includes comparing first pixel values of the first frame with second pixel values of the second frame to generate a disparity image including third pixels based at least in part on the aligning. For example, the disparity image generator 30 may generate a disparity image using the differences in pixel values.

The method 850, at block 858, includes combining one or more subsets of the third pixels of the disparity image having disparity values above a first threshold value. For example, the pixels with similar values may be combined using the combiner 32 to form groups of pixels.

The method 800, at block 860, includes generating a bounding shape for at least one of the one or more subsets of the third pixels. For example, the bounding shape generator 36 may generate a bounding shape corresponding to each set of pixels determined to correspond to an object or debris.

Example Autonomous Vehicle

Figure 9A:
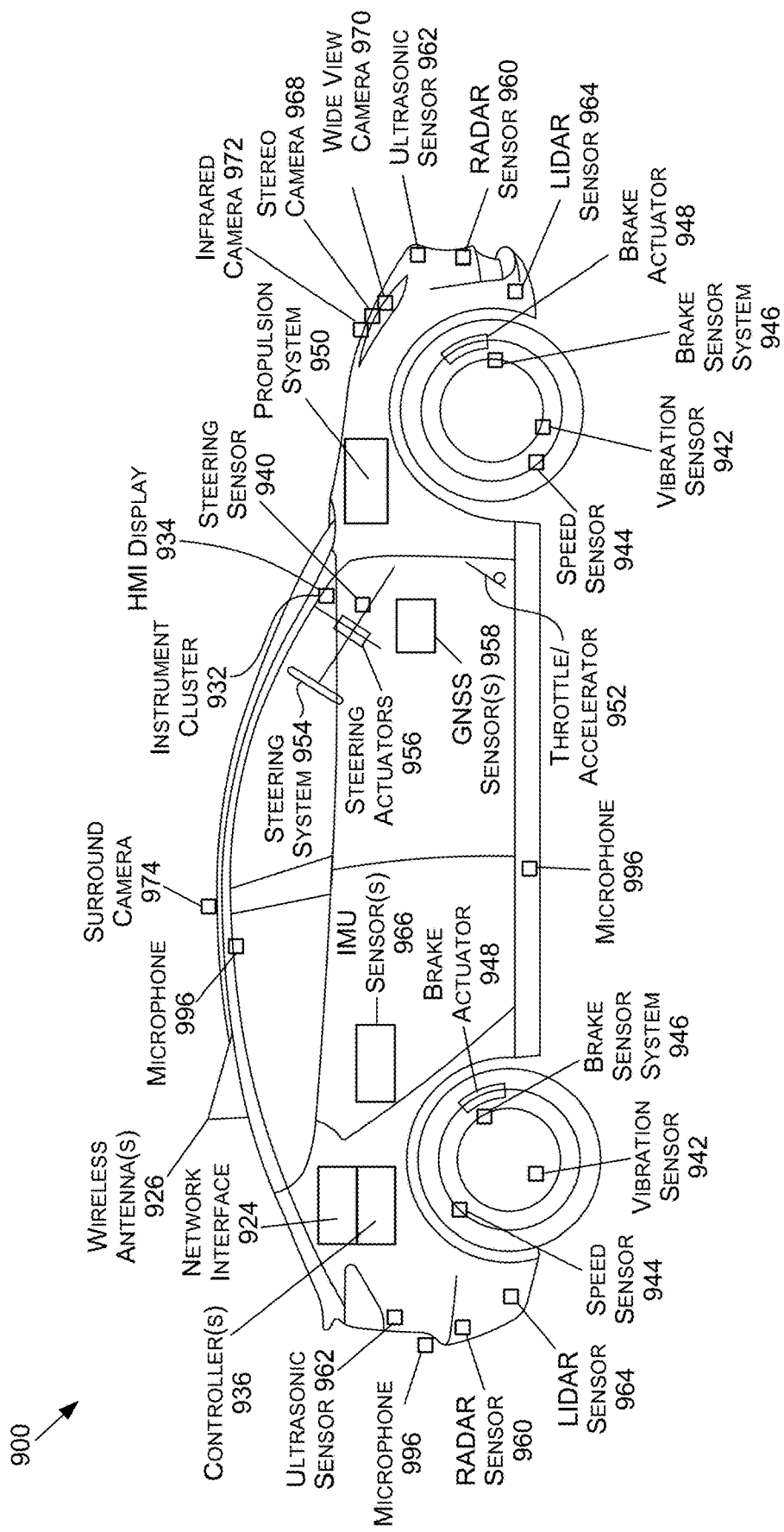
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. For example, the vehicle 900 may be capable of conditional automation (Level 3), high automation (Level 4), and/or full automation (Level 5), depending on the embodiment.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the HD map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over LTE, WCDMA, UMTS, GSM, CDMA2000, etc. The wireless antenna(s) 926 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 9B:
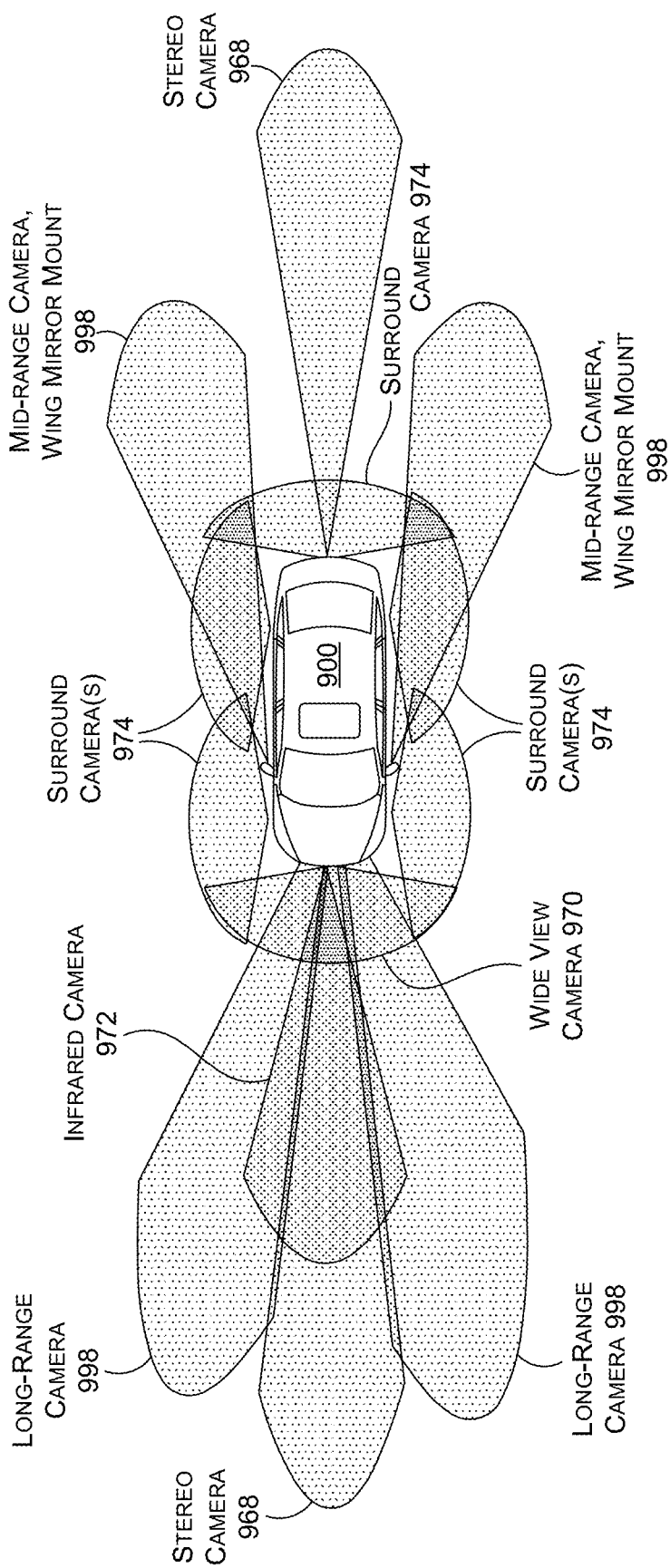
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may any number of wide-view cameras 970 on the vehicle 900. In addition, long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

One or more stereo cameras 968 may also be included in a front-facing configuration. The stereo camera(s) 968 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
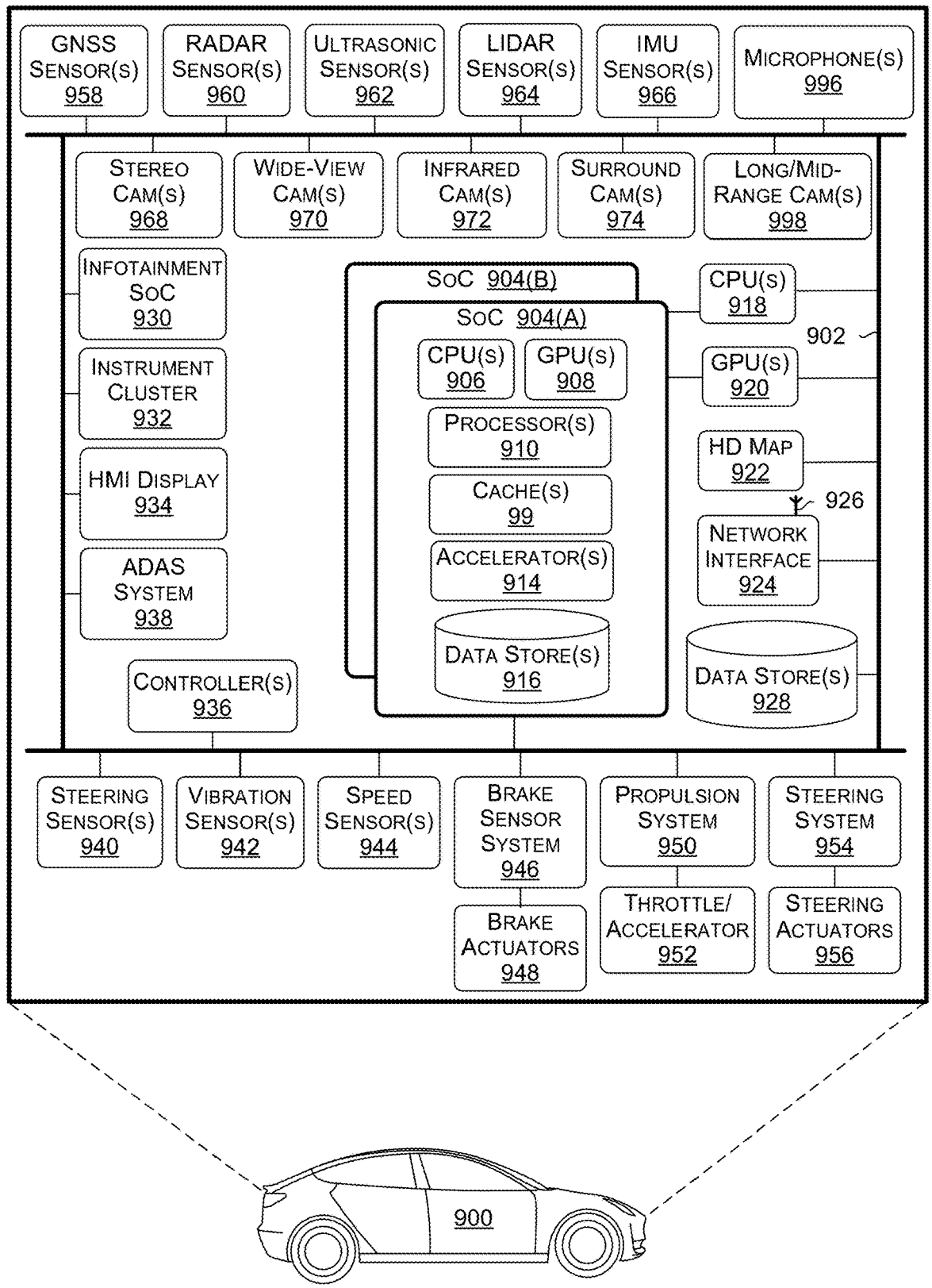
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK).

The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
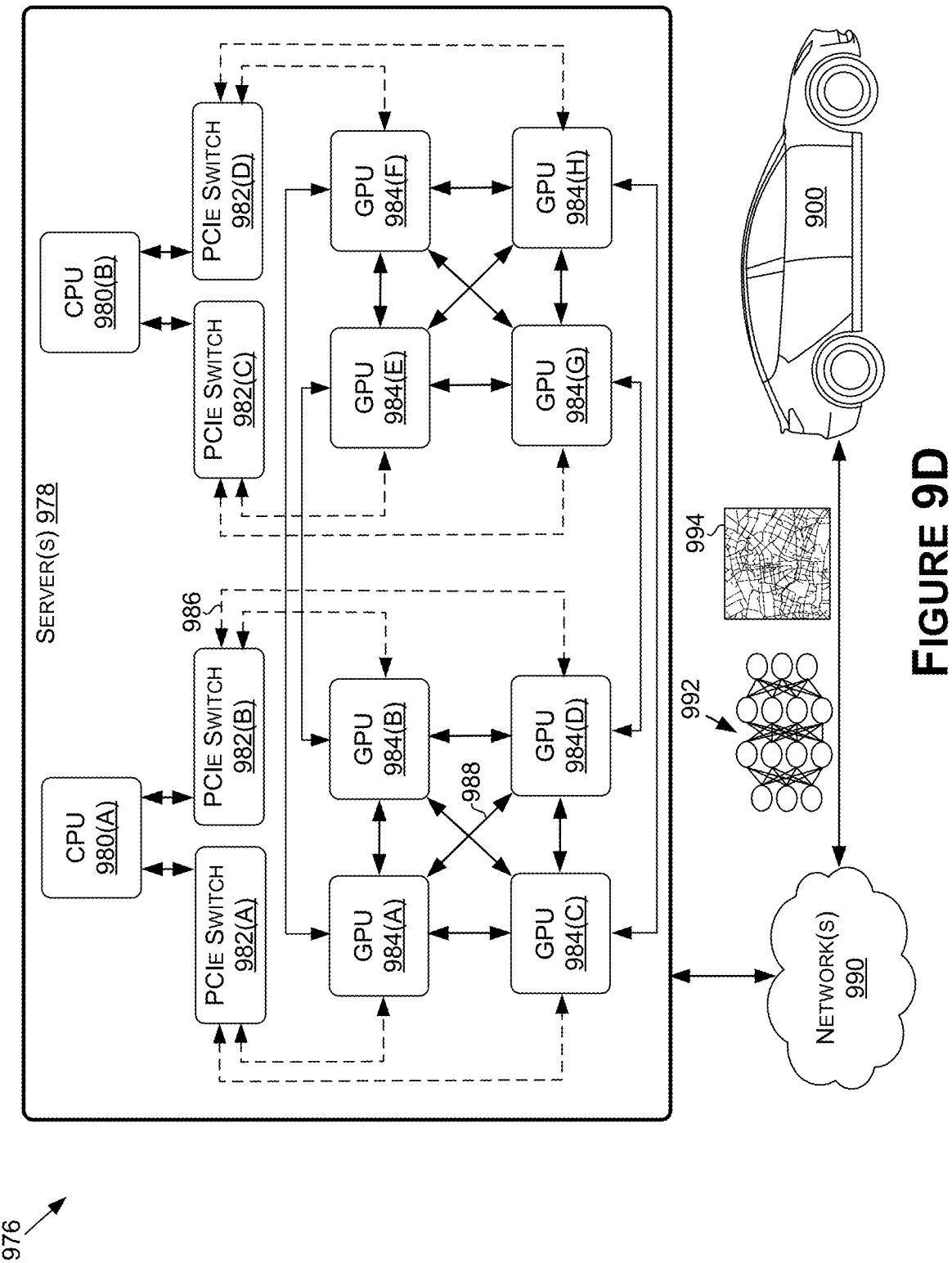
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
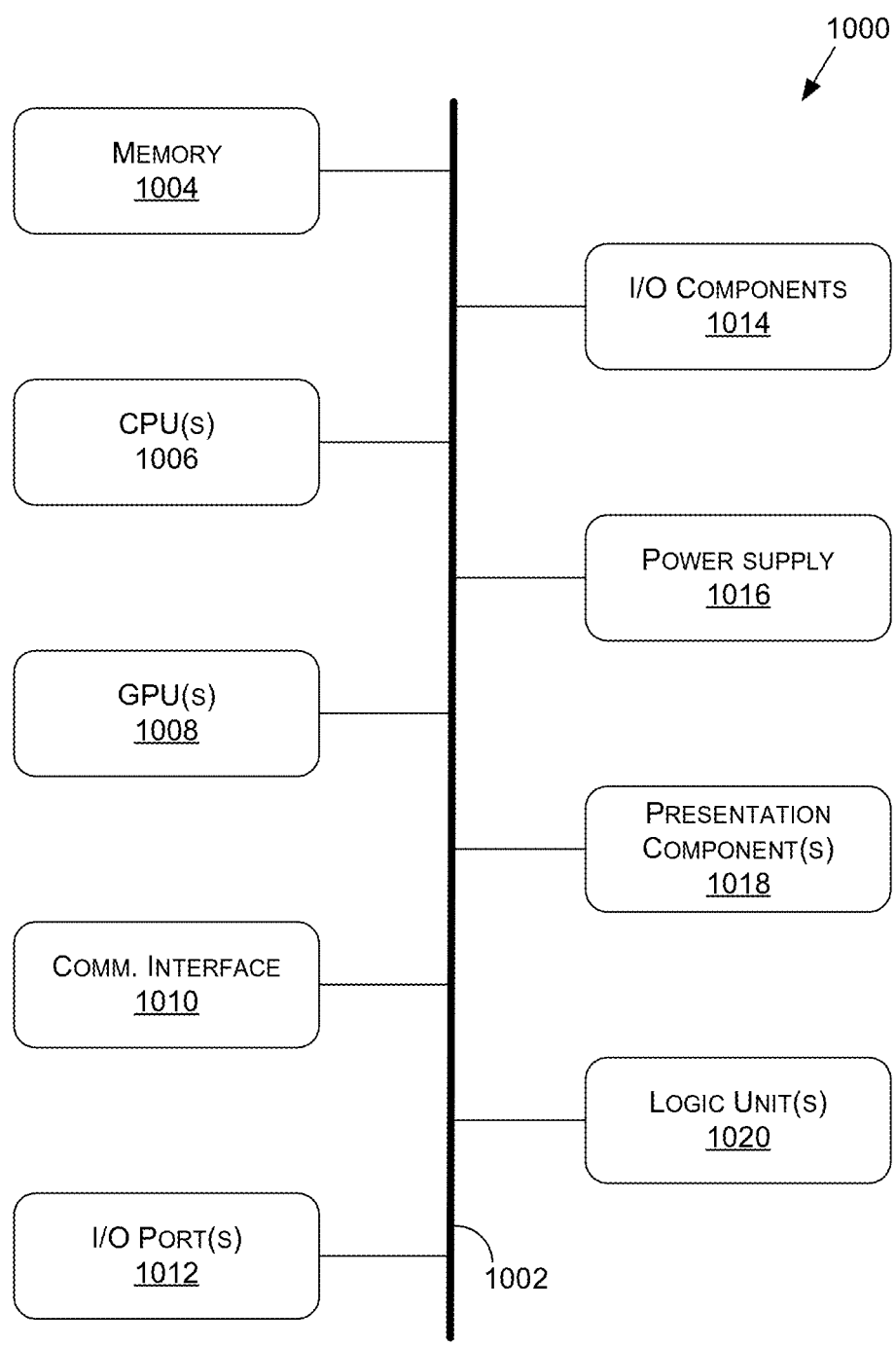
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

Example Data Center

Figure 11:
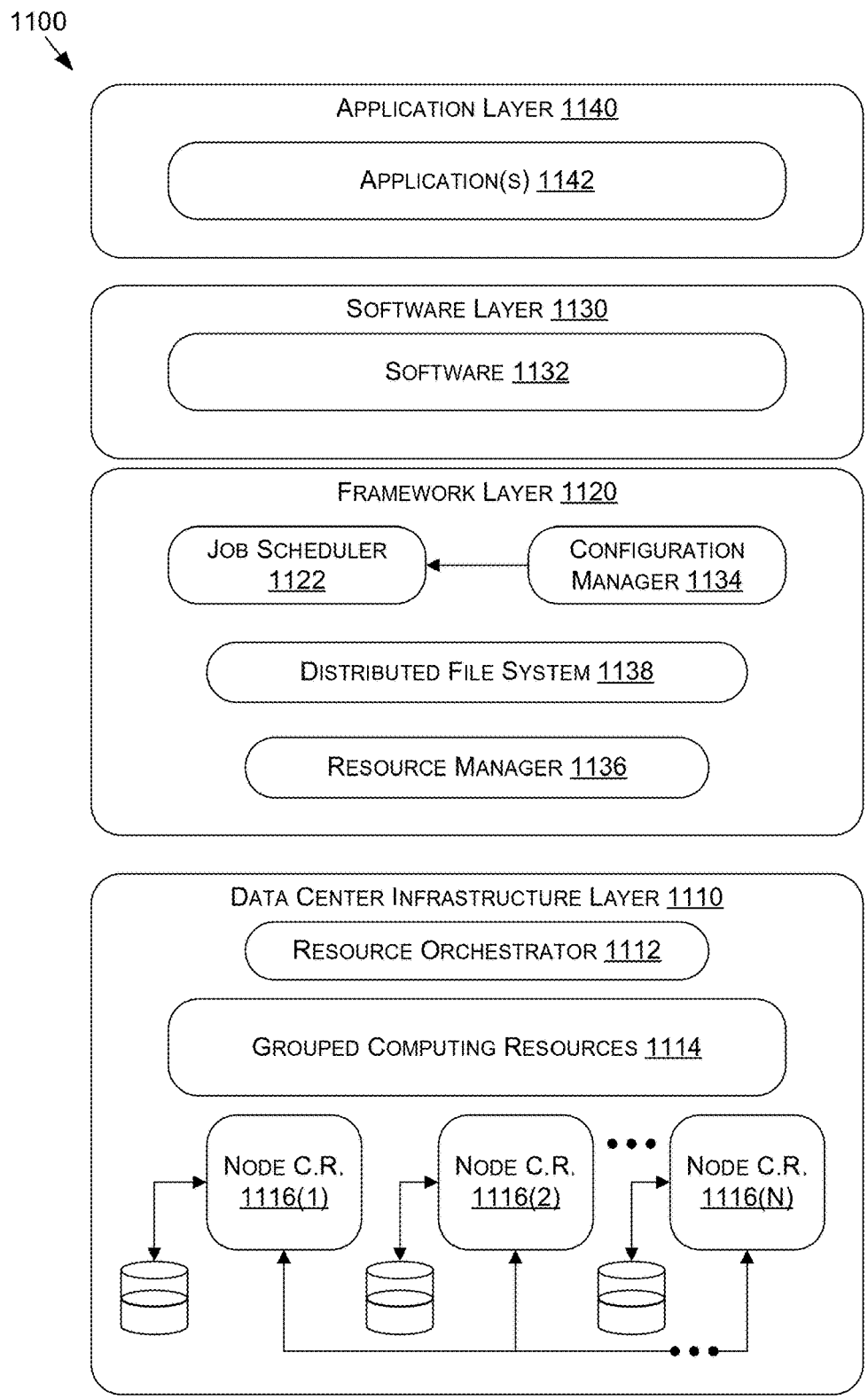
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161(N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, and/or other processors may be grouped within one or more racks to provide compute resources to support one or more workloads. The one or more racks may also include any number of power modules, cooling modules, and/or network switches, in any combination.

The resource orchestrator 1122 may configure or otherwise control one or more node C.R.s 1116(1)-1116(N) and/or grouped computing resources 1114. In at least one embodiment, resource orchestrator 1122 may include a software design infrastructure ("SDI") management entity for the data center 1100. The resource orchestrator 1122 may include hardware, software, or some combination thereof.

In at least one embodiment, as shown in FIG. 11, framework layer 1120 may include a job scheduler 1132, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may use distributed file system 1138 for large-scale data processing (e.g., "big data"). In at least one embodiment, job scheduler 1132 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1132. In at least one embodiment, clustered or grouped computing resources may include grouped computing resource 1114 at data center infrastructure layer 1110. The resource manager 1036 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A processor comprising processing circuitry to:
    convert a first frame and a second frame to aligned images corresponding to a common image plane based at least on rectifying at least one of the first frame or the second frame to the common image plane;
    blend pixel values of aligned pixels between the aligned images to compute difference values indicating differences between the pixel values across the aligned pixels;
    generate a disparity image including third pixels having disparity values corresponding to the difference values and indicating the differences between the pixel values across the aligned pixels;
    combine one or more subsets of the third pixels of the disparity image having the differences above a first threshold value into one or more groups of the third pixels based at least on similarities between the disparity values within the one or more groups;
    compute one or more scores for the one or more groups of the third pixels, a score of the one or more scores for a group of the one or more groups being based at least on a number of pixels in the group and associated disparity values for the pixels in the group; and
    generate a bounding shape for the group based at least on the score being above a second threshold value.

2. The processor of claim 1, wherein the first frame and the second frame are captured using a single camera.

3. The processor of claim 1, wherein the blending includes subtracting the aligned images from one another to produce a difference image that corresponds to the disparity image.

4. The processor of claim 1, wherein the processing circuitry is further to perform the converting based at least on analyzing a Region of Interest (ROI) between the first frame and the second frame, wherein the ROI is initialized, at least in part, by setting a top boundary of the ROI according to a first distance threshold and a bottom boundary of the ROI according to a second distance threshold.

5. The processor of claim 1, wherein the disparity values are at a minimum value when there are no differences between the pixel values across the aligned pixels.

6. The processor of claim 1, wherein the processing circuitry computes the score for the group, at least in part, by multiplying the number of pixels by the associated disparity values for each of the pixels in the group.

7. The processor of claim 1, wherein the disparity values represent one or more of a difference in color between a set of the aligned pixels or a difference in intensity between the set of the aligned pixels.

8. The processor of claim 1, wherein the processing circuitry is further to: perform an optical flow analysis on the first frame and the second frame after the rectifying to generate an updated alignment of the first frame and the second frame, wherein the disparity image is generated based at least on the updated alignment.

9. The processor of claim 8, wherein the converting causes the differences to be larger for sets of the aligned pixels based at least on the sets of the aligned pixels being above a ground plane in the aligned images.

10. The processor of claim 1, wherein the processing circuitry combines the one or more subsets of the third pixels of the disparity image into the one or more groups, at least in part, by performing a connected components analysis on the disparity values.

11. The processor of claim 1, wherein the disparity image includes a binary detection map in which first sets of the disparity values having the differences determined to be greater than the first threshold value are encoded with a first value and second sets of the disparity values having the differences determined to be less than the first threshold value are encoded with a second value.

12. The processor of claim 1, wherein the bounding shape is generated, at least in part, by determining one or more dimensions of the bounding shape such that the bounding shape corresponds to a minimum bounding shape that encompasses each pixel of the group.

13. The processor of claim 1, wherein the disparity values are the difference values and a difference value of the difference values is computed by subtracting a first pixel value of a first pixel at a pixel location in a first image of the aligned images from a second pixel value of a second pixel at the pixel location in a second image of the aligned images.

14. The processor of claim 1, wherein the processing circuitry is further to perform the converting based at least on analyzing a Region of Interest (ROI) between the first frame and the second frame, and initialize a new ROI when the ROI is within a threshold pixel distance to a bottom of a frame or after the ROI has been used for a threshold number of frames.

15. A method comprising:
    converting a first frame and a second frame to aligned images corresponding to a common image plane based at least on rectifying at least one of the first frame or the second frame to the common image plane;
    blending pixel values of aligned pixels between the aligned images to compute difference values indicating differences between the pixel values across the aligned pixels;
    generating a disparity image including third pixels having disparity values corresponding to the difference values and indicating the differences between the pixel values across the aligned pixels;
    combining one or more subsets of the third pixels of the disparity image having the differences above a first threshold value into one or more groups of the third pixels based at least on similarities between the disparity values within the one or more groups; and
    generating a bounding shape for at least one of the one or more groups of the third pixels.

16. The method of claim 15, wherein the converting is determined, at least in part, by:
    initializing a Region of Interest (ROI) with respect to the first frame;
    identifying a set of points within the ROI of the first frame;
    determining the ROI in the second frame; and
    identifying the set of points within the ROI of the second frame.

17. The method of claim 16, wherein the initializing includes:
receiving data representative of freespace boundaries within the first frame; and
setting a left boundary and a right boundary of the ROI according to the freespace boundaries.

18. The method of claim 17, wherein initializing the ROI further includes setting a top boundary of the ROI according to a first distance threshold and a bottom boundary of the ROI according to a second distance threshold.

19. The method of claim 15, further comprising scoring the one or more groups based at least on a number of pixels in each of the one or more groups and associated disparity values for each of the pixels of the one or more groups.

20. The method of claim 19, wherein the scoring includes multiplying the number of pixels in each of the one or more groups, at least in part, by the associated disparity values for each of the pixels of the one or more groups.

21. The method of claim 15, further comprising:
performing an optical flow analysis on the first frame and the second frame after the rectifying to generate an updated alignment of the first frame and the second frame, wherein the disparity image is generated based at least on the updated alignment.

22. The method of claim 15, wherein the generating the bounding shape includes determining dimensions of the bounding shape such that the bounding shape corresponds to a minimum bounding shape that encompasses each pixel of a group of the at least one of the one or more groups of the third pixels.

23. The method of claim 15, wherein a difference value of the difference values is computed by subtracting a first pixel value of a first pixel at a pixel location in a first image of the aligned images from a second pixel value of a second pixel at the pixel location in a second image of the aligned images.

24. A system comprising:
one or more hardware processing units to execute operations comprising:
converting a first frame and a second frame to aligned images corresponding to a common image plane based at least on rectifying at least one of the first frame or the second frame to the common image plane;
blending pixel values of aligned pixels between the aligned images to compute difference values indicating differences between the pixel values across the aligned pixels;
generating a disparity image including third pixels having disparity values corresponding to the difference values and indicating the differences between the pixel values across the aligned pixels;
combining one or more subsets of the third pixels of the disparity image having the differences above a first threshold value into one or more groups of the third pixels based at least on similarities between the disparity values within the one or more groups; and
generating a bounding shape for at least one of the one or more groups of the third pixels.

25. The system of claim 24, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

26. The system of claim 24, further comprising scoring the one or more groups of the third pixels based at least in part on a number of pixels in each of the one or more groups of the third pixels and associated disparity values for each of the pixels of the one or more groups of the third pixels.

27. The system of claim 26, wherein the scoring includes multiplying the number of pixels in each of the one or more groups of the third pixels by the associated disparity values for each of the pixels of the one or more groups of the third pixels.

28. The system of claim 24, wherein the combining the one or more groups of the third pixels of the disparity image includes performing a connected components analysis.

29. The system of claim 24, wherein generating the bounding shape includes determining dimensions of the bounding shape such that the bounding shape corresponds to a minimum bounding shape that encompasses each pixel of a group of the one or more groups.

30. The system of claim 24, further comprising tracking the bounding shape across frames.

31. The system of claim 24, wherein the disparity values comprise binary values generated using the first threshold value.

* * * * *